US008035975B2

(12) United States Patent
Wu (10) Patent No.: US 8,035,975 B2
(45) Date of Patent: Oct. 11, 2011

(54) LOW PROFILE ELECTRONIC MODULE WITH EJECTOR MECHANISM

(75) Inventor: Jerry Wu, Irvine, CA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 459 days.

(21) Appl. No.: 12/321,089

(22) Filed: Jan. 12, 2009

(65) Prior Publication Data

US 2010/0091467 A1    Apr. 15, 2010

Related U.S. Application Data

(63) Continuation-in-part of application No. 12/287,966, filed on Oct. 14, 2008.

(51) Int. Cl.
*G02B 6/00* (2006.01)
*G02B 6/36* (2006.01)
*H01R 13/62* (2006.01)

(52) U.S. Cl. ........ 361/747; 361/727; 361/728; 439/152; 439/160; 439/352; 439/372; 385/56; 385/88; 385/92

(58) Field of Classification Search ............. 361/679.01, 361/679.58, 724–728, 732, 747, 754–757, 361/759, 798, 801, 816, 818, 831; 385/53, 385/56, 59, 76–79, 85, 86, 88, 92, 134, 139; 439/152, 160, 157, 188, 352, 353, 357, 567, 439/571, 607, 607.1, 607.01, 607.18, 610, 439/372, 92, 483, 630, 256; 24/294, 540, 24/272, 366, 59, 458, 522, 371, 539, 313; 16/422, 429, 110.1, 438; 292/175, 152, 153, 292/147, 87, 89, 197
See application file for complete search history.

(56) References Cited

U.S. PATENT DOCUMENTS

| 6,749,448 | B2 | 6/2004 | Bright et al. |
| 6,824,416 | B2 * | 11/2004 | Di Mascio ..................... 439/352 |
| 6,851,867 | B2 | 2/2005 | Pang et al. |
| 6,884,097 | B2 | 4/2005 | Ice |
| 6,908,323 | B2 | 6/2005 | Ice |
| 7,052,306 | B2 | 5/2006 | Ishigami et al. |
| 7,064,959 | B2 | 6/2006 | Kim |
| 7,077,578 | B2 | 7/2006 | Lee et al. |
| 7,077,686 | B2 | 7/2006 | Seo et al. |
| 7,090,523 | B2 | 8/2006 | Shirk et al. |
| 7,351,090 | B1 * | 4/2008 | Moore .......................... 439/372 |
| 7,402,070 | B1 * | 7/2008 | Wu ............................... 439/352 |
| 7,416,433 | B1 * | 8/2008 | Wu ............................... 439/372 |
| 7,427,457 | B1 * | 9/2008 | Plat et al. ........................ 430/5 |
| 7,429,185 | B1 * | 9/2008 | Wu ............................... 439/372 |

(Continued)

*Primary Examiner* — Michail V Datskovskiy
(74) *Attorney, Agent, or Firm* — Wei Te Chung; Andrew C. Cheng; Ming Chieh Chang (57) ABSTRACT

An electronic module (100) includes a housing having a longitudinal body portion and a mounting portion extending rearward from the body portion, with a channel defined in a top or bottom section of the mounting portion; a slider member (61) accommodated in the channel of mounting portion; an actuator member (62) including a transversal beam (621) across the mounting portion and two leg portions (622) connected to opposite ends of the transversal beam and disposed outward of lateral sides of the mounting portion, said leg portions pivotally linked to the mounted portion of the housing and connected to the slider member; and a pull member (64) having two arm portions (641) spaced apart one another and an intermediate portion (642) connected to the arm portions, said two arm portions arranged under the transversal beam and engaged with the leg portions of the actuator member.

18 Claims, 7 Drawing Sheets

U.S. PATENT DOCUMENTS 7,445,485 B1 * 11/2008 Wu .............................. 439/352
7,513,693 B2 * 4/2009 Wang ............................. 385/56
7,643,720 B2 * 1/2010 Kim et al. ..................... 385/134
2005/0135756 A1 * 6/2005 Zhang et al. ................... 385/92

* cited by examiner

LOW PROFILE ELECTRONIC MODULE WITH EJECTOR MECHANISM

CROSS-REFERENCE TO RELATED APPLICATION

This application is continuation-in-part (CIP) of U.S. patent application Ser. No. 12/287,966 filed on Oct. 14, 2008 and entitled "ELECTRONIC MODULE WITH EJECTOR MECHANISM", which has the same applicant and assignee as the present invention. The disclosure of the related application is incorporated herein by reference.

BACKGROUND OF THE INVENTION

1. Field of the Invention

The present invention generally relates to an electronic module, and more particularly to a low profile and easy manipulated electronic module.

2. Description of Related Art

SFP (Small Form-factor Pluggable), X-SFP and QSFP are all modules for fiber optic transmission or ordinary signal transmission. All of the modules are of small size or form factor which is important. The smaller the form factor of the module, the less space taken on a printed circuit board to which it couples. A smaller form factor allows a greater number of modules to be coupled onto a printed circuit board to support additional communication channels. However, the smaller form factor makes it more difficult for a user to handle.

When such a module embedded in a system fails, it is desirable to replace it, particularly when other communication channels are supported by other modules. To replace a failed module, it needs to be pluggable into a module receptacle. While, plugging in a new module is usually easy, it is more difficult to remove the failed module because of other components surrounding it. Additionally, a user should not attempt to pull on cables of the module in order to try and remove a failed module or else the user might cause damage thereto.

A typical release method for a pluggable module is to push in on the module itself and then pull out on the module to release it from a cage assembly or module receptacle. It has been determined than this method is not very reliable with users complaining of the difficulty in removing pluggable modules in such manner. Users often complain that traditional methods offer little leverage in getting a sufficient grip on the module when attempting to pull it out of a module receptacle. Another complaint is that traditional actuators used to remove modules are inaccessible or invisible. Other users complain than once released by the traditional method, it is difficult to withdraw the module out of its cage or module receptacle.

Therefore, designers developed different solutions to solve above problems accounted by the users, such as disclosed by U.S. Pat. Nos. 6,851,867, 6,749,448, 6,884,097, 6,908,323, 7,052,306, 6,824,416 and 7,090,523. The theories of theses patents are substantially the same, that is each module is received in corresponding cage or module receptacle and comprises a pair of sliders with forward ends engaging with tabs of the cage, and a bail or lever capable of rotating to actuate the sliders linearly to separate forward ends of the sliders from the tabs. The action theory of theses patents successfully solve the problems mentioned above. However, for returning to original position, the latch mechanisms usually adopt bias elements which provide elastic restore force to the latch mechanism. The present invention provides an electronic module with an improved ejector mechanism having self spring back function.

SUMMARY OF THE INVENTION

Accordingly, an object of the present invention is to provide an electronic module having an improved ejector mechanism.

In order to achieve the object set forth, an electronic module comprising a housing having a longitudinal body portion and a mounting portion extending rearward from the body portion, the mounting portion having a channel; a slider member accommodated in the channel of mounting portion; an actuator member including a transversal beam across the mounting portion and two leg portions connected to opposite ends of the transversal beam and disposed outward of lateral sides of the mounting portion, said leg portions pivotally linked to the mounting portion of the housing and connected to the slider member; and a pull member having two arm portions spaced apart from each other and an intermediate portion connected to the arm portions, said two arm portions arranged under the transversal beam and engaged with the leg portions of the actuator member.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Referring to FIGS. 1-7, an electronic module 100 comprises a housing (not numbered) including a conductive base portion 1 and a conductive panel portion 2, a printed circuit board 3, a cable 4, a metal gasket 5 and an ejector mechanism (not numbered) for separating the electronic module 100 from a complementary connector (not shown). The electronic module 100 further has a spring member 8 assembled to the ejector mechanism for providing a return force. The housing has a longitudinal body portion (not numbered) and a mounting portion (not numbered) extending rearward from the body portion. The metal gasket 5 is attached to a rear segment of a peripheral surface of the body portion and adjacent to the mounting portion.

Figure 1:
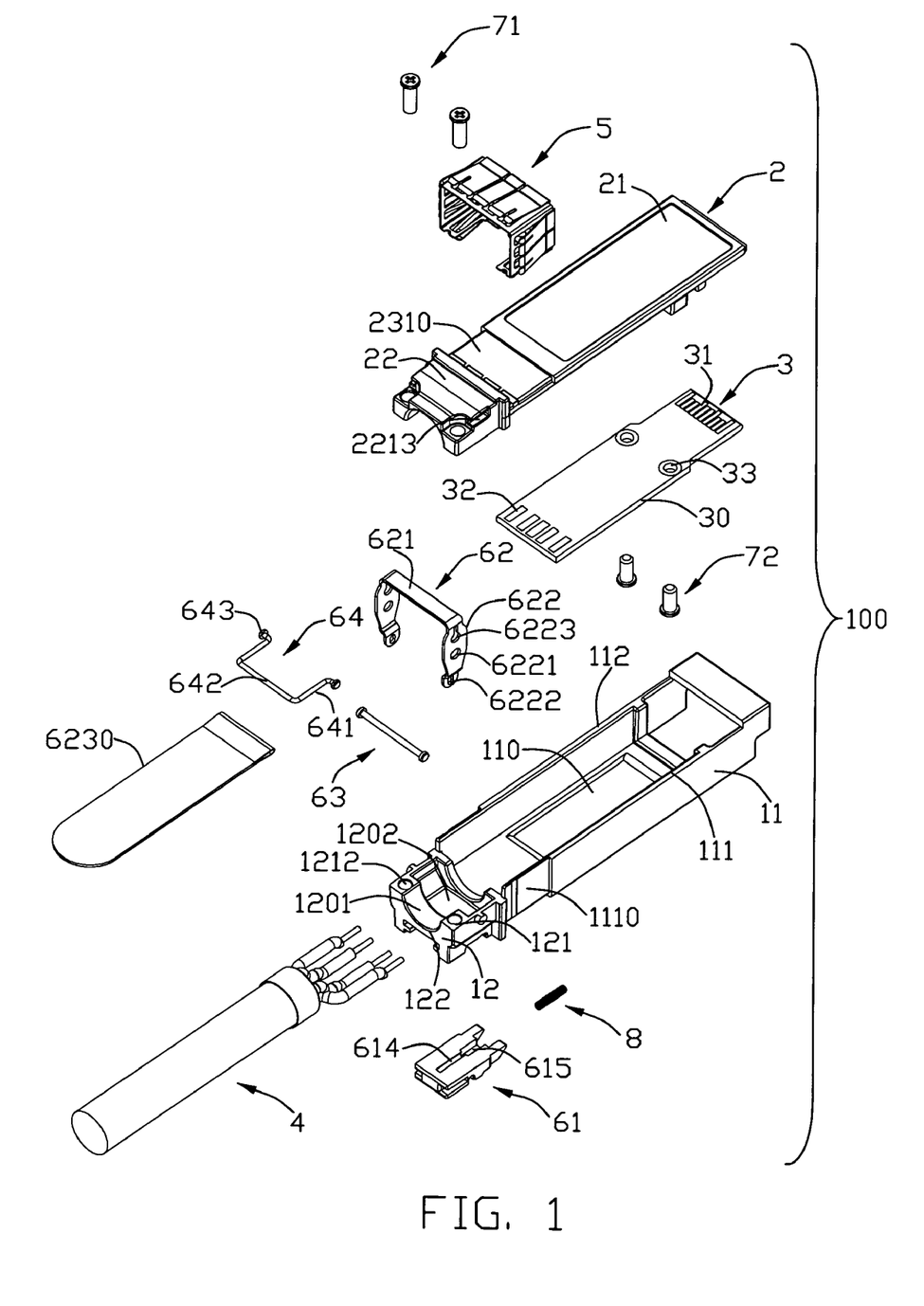
FIG. 1 is an exploded, perspective view of an electronic module in accordance with the present invention.
Figure 2:
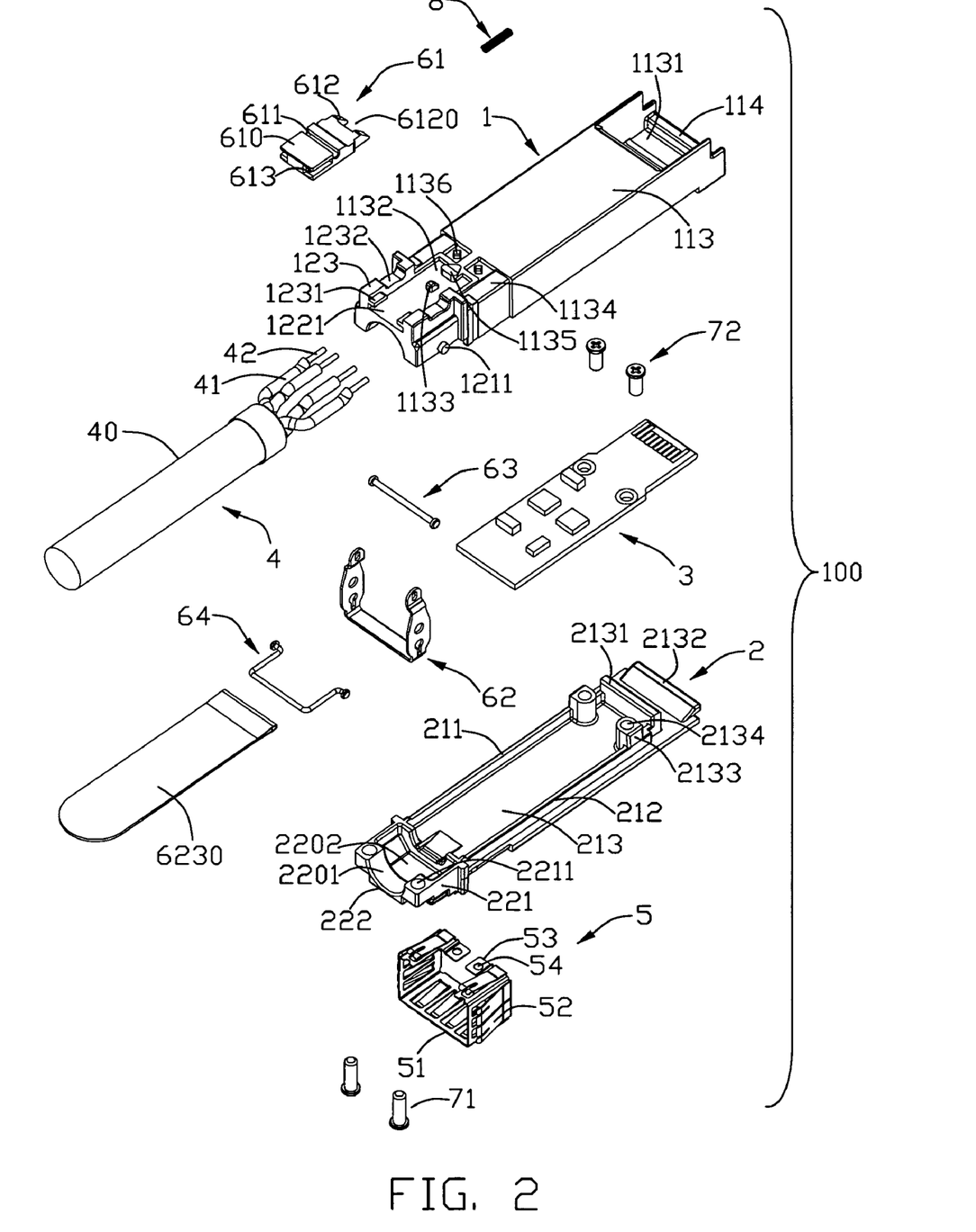
FIG. 2 is a view similar to FIG. 1, but viewed from another aspect.
Figure 3:
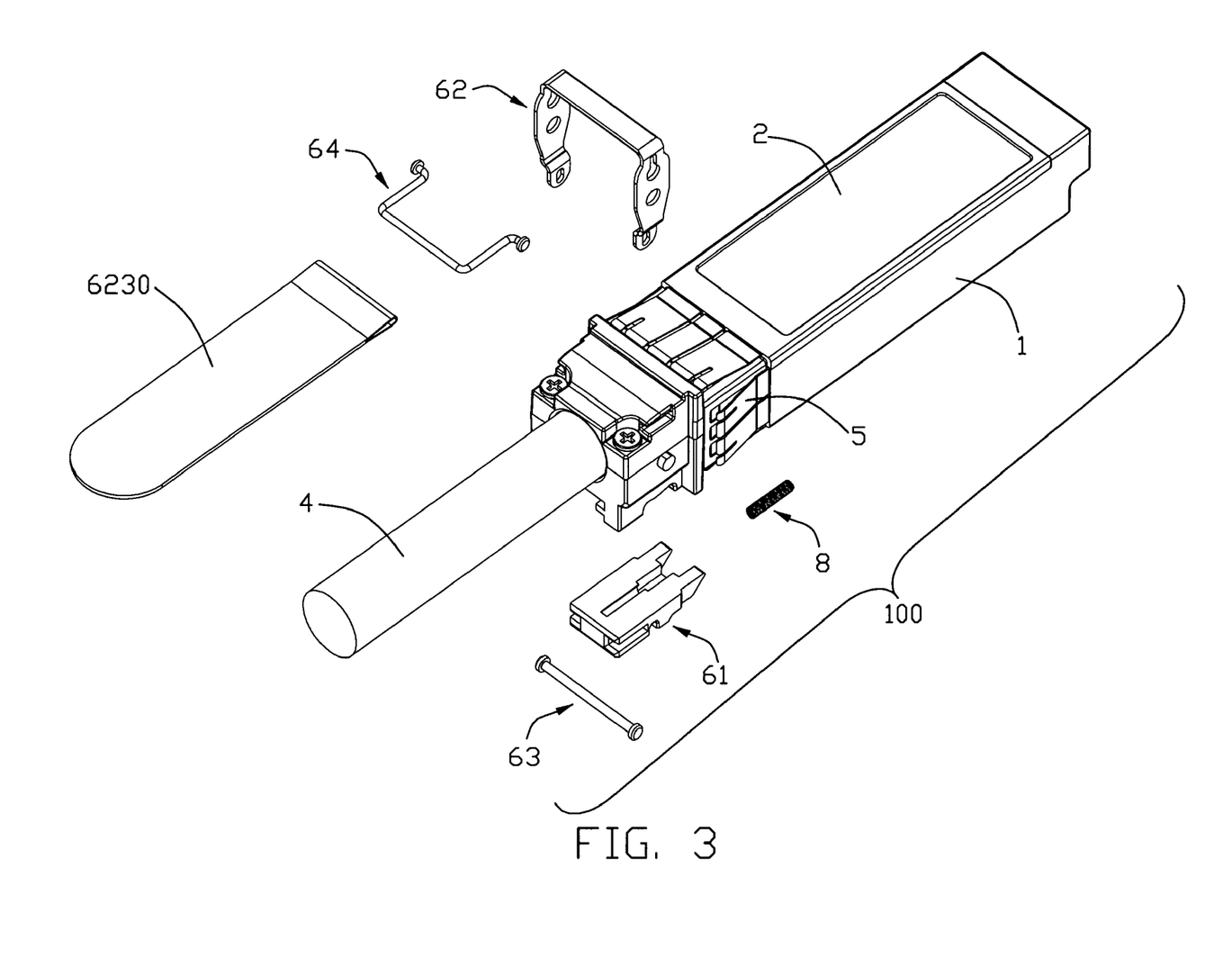
FIG. 3 is a partially assembled, perspective view of the electronic module.
Figure 4:
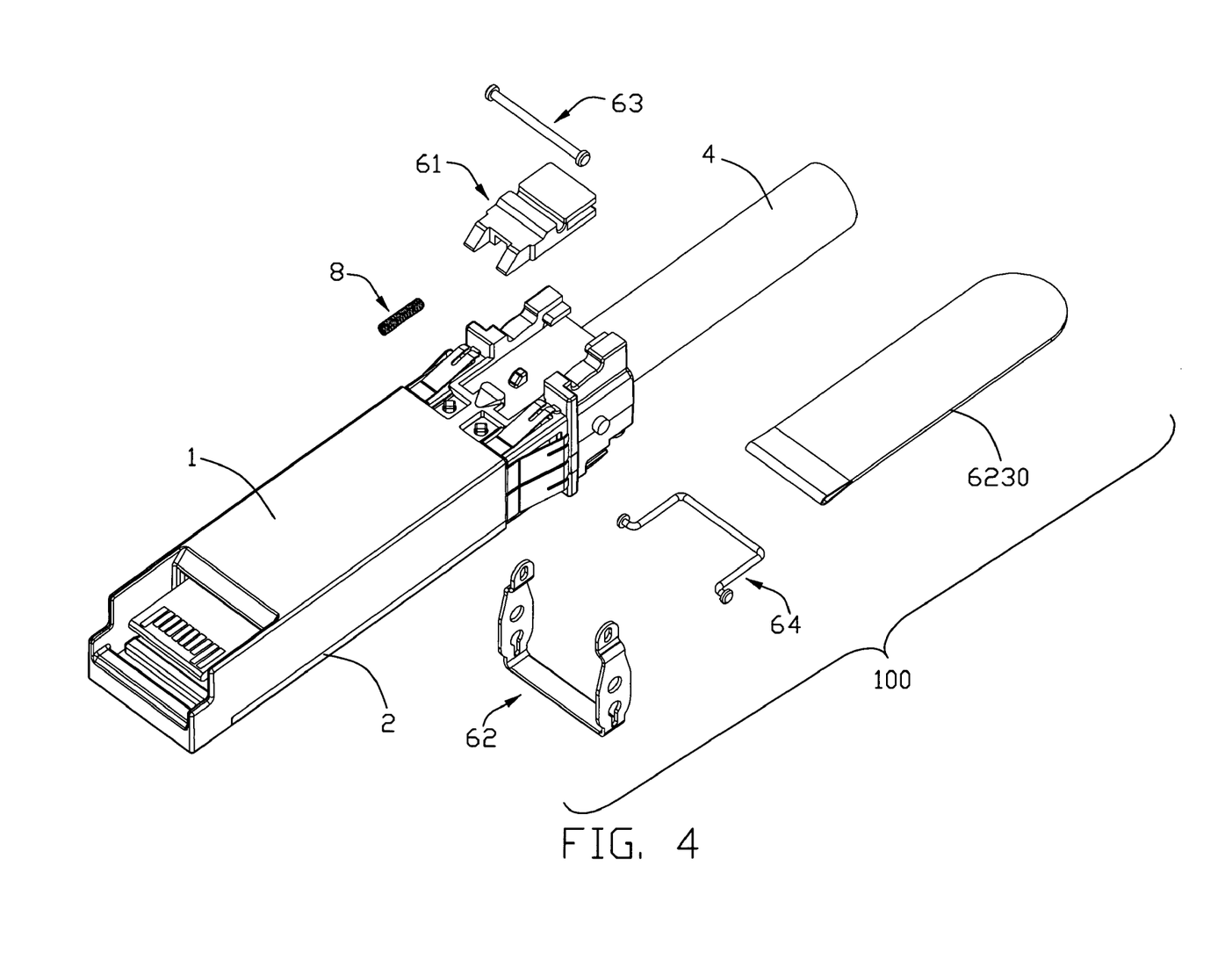
FIG. 4 is a view similar to FIG. 3, but viewed from other aspect.
Figure 5:
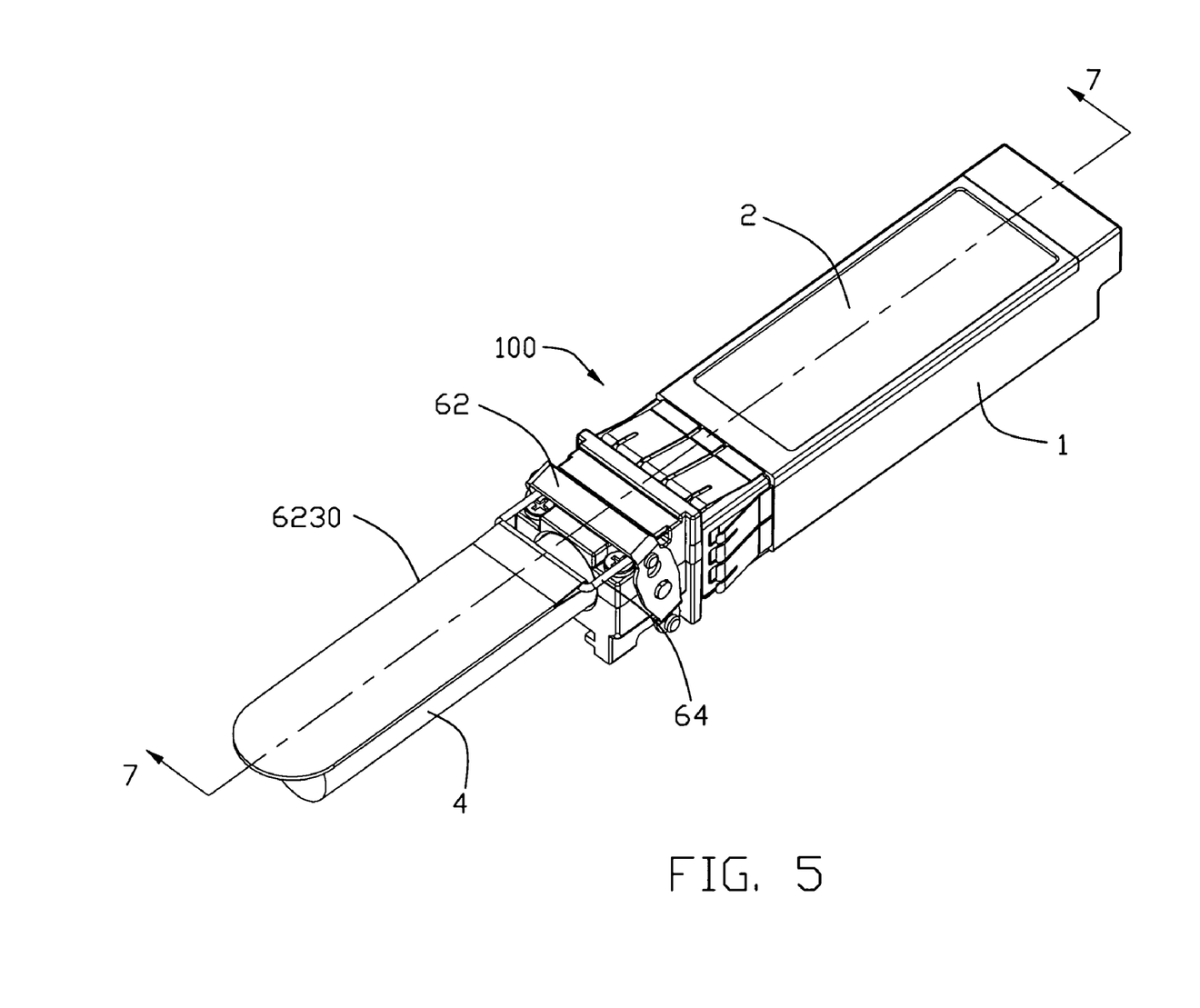
FIG. 5 is an assembled, perspective view of the electronic module.
Figure 6:
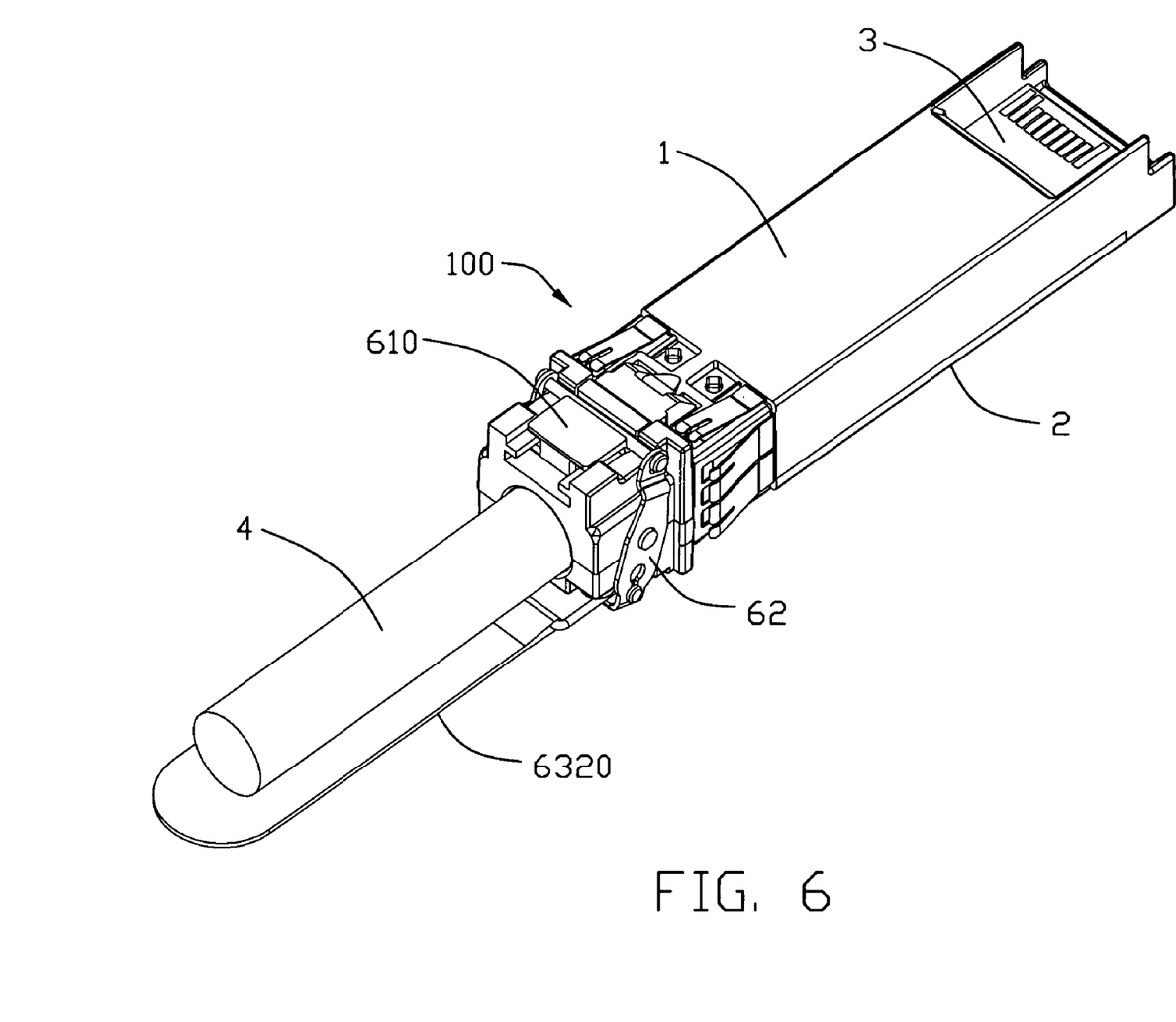
FIG. 6 is a view similar to FIG. 5, but viewed from other aspect.
Figure 7:
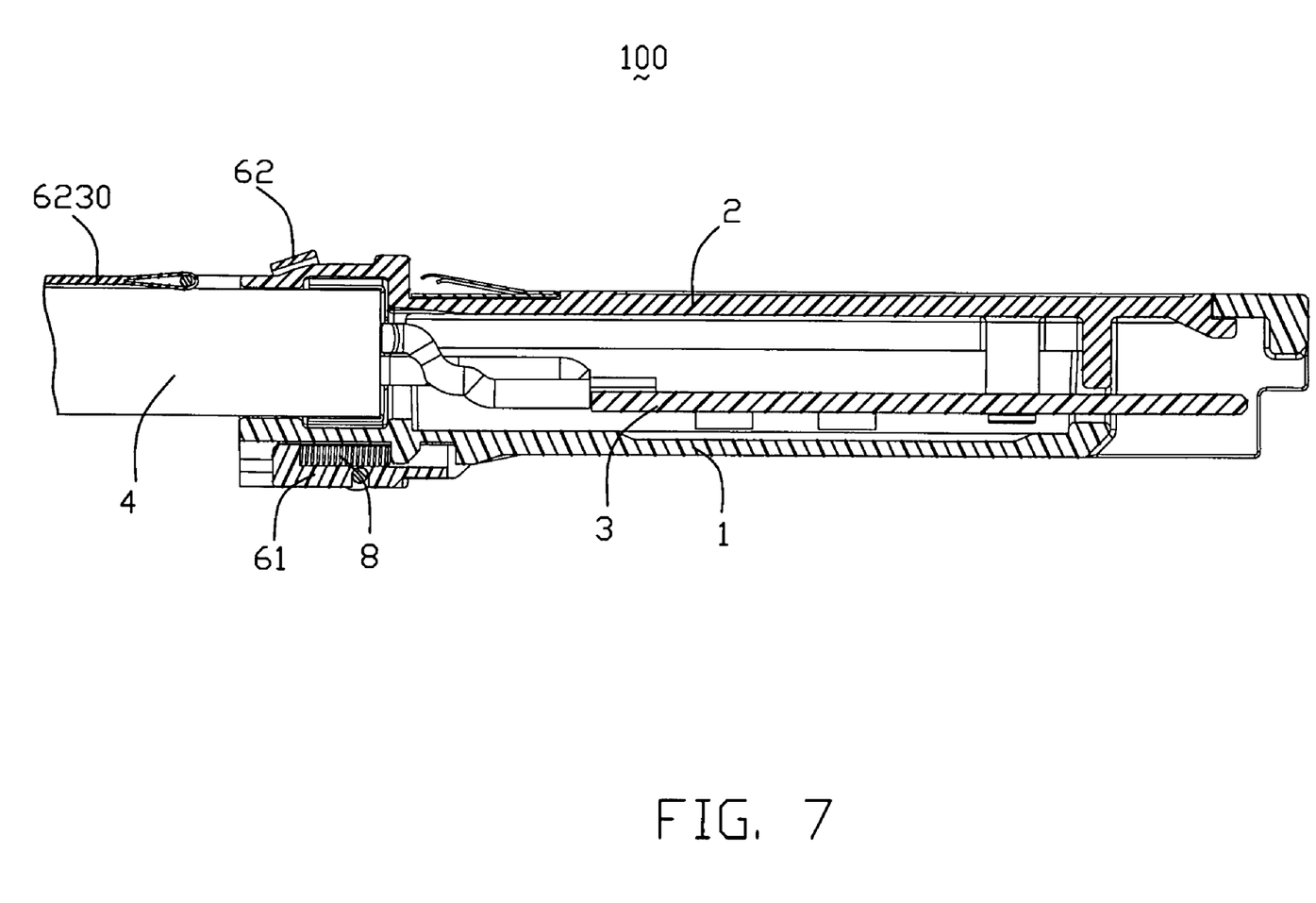
FIG. 7 is a cross-section view taken along line 7-7 of FIG. 5.

Referring to FIGS. 1-2, the base portion 1 is die-cast or other metal plated body, including a primary body portion 11 and a first mounting portion 12 rearward extending from back segment of the primary body portion 11. The primary body portion 11 has a pair of lateral walls 111, 112 and a bottom wall 113 joining to lower sections of the two lateral walls 111, 112 to from a receiving space 110 with an upper window (not numbered). Rear sections of the pair of the lateral walls 111, 112 define a pair of first depression portions 1110. A front section of the bottom wall 113 is cut to form an outlet 1131. A rear section of the bottom wall defines a first channel 1132 located in a middle area thereof, with a lock tab 1135 formed in the front and middle therein. A pair of L-shaped depression portions 1134 are defined in two lateral areas of the rear section of the bottom wall 113, disposed outward of the first channel 1132. A pair of tiny posts 1136 are respectively arranged in the pair of L-shaped depression portions 1134 and adjacent to one another. The primary body portion 11 further has beam portion 114 with substantially L-shaped cross-section interconnecting distal portions of the pair of the lateral walls 111, 112.

The first mounting portion 12 has a pair of side walls 121 and a lower wall 122 to corporately form a first semi-circular cavity 1201 and a deeper first position slot 1202 located in front of the first semi-circular cavity 1201. A second channel 1221 is defined in a middle area of the lower wall 122 and communicates with the first channel 1132 of the primary body portion 11. A stop member 1133 is located in a front portion of the second channel 1221 and aligns with the lock tab 1135 along a front-to-back direction. A pair of guiding members 123 are respectively formed on lateral areas of the lower wall 122. A thin bar member 1231 projects inwardly from an inner surface of a rear portion of each guiding member 123. A lengthways guiding groove 1232 is located in a middle segment of each guiding member 123 and disposed in front of the bar member 1231. A pair of pivot members 1211 are respectively formed on upper sections of the outer surfaces of the pair of side walls 121. A pair of screw holes 1212 are respectively recessed downward from up surfaces of rear sections of the side walls 121.

The panel portion 2 is a die-cast or metal plated body, including a secondary body portion 21 and a second mounting portion 22 rearward extending from back segment of the secondary body portion 21. The secondary body portion 21 has a planar board member 213 and a pair of flange members 211, 212 formed at lateral sides of the board member 213. A second depression portion 2130 is defined in a peripheral portion of a rear portion of the board member 213. A vertical wall 2131 is arranged on an inner side of the front section of the board member 213. A pair of supporting posts 2133 are located behind the vertical wall 2131, and each supporting post 2133 further defines a second screw hole 2134 therein. A protrusion portion 2132 extends forwardly form inner surface of a front portion of the board member 213.

The panel portion 2 further includes a second mounting portion 22 rearward extending from a back face of the secondary body portion 21. The second mounting portion 22 also has a pair of side walls 221 and a lower wall 222 to corporately form a second semi-circular cavity 2201 and a deeper second position slot 2202 located in front of the second semi-circular cavity 2201. A pair of through holes 2211 are respectively defined in a rear section of the side walls 221. Two mounting slots 2213 are respectively defined in lateral sides of a front section of the side walls 221.

The ejector mechanism includes a slider member 61, an actuator member 62 and a fasten member 63, and a pull member 64.

The slider member 61 has a substantially rectangular shaped body portion 610 and two wedge-shaped tabs 612 extending forward from the body portion 610. The two tabs 612 space from one another, with a passage 6120 formed therebetween. A cavity 611 is recessed downwardly from an upper surface of a middle segment of the body portion 610, and two grooves 613 respectively recessed inward from lateral surfaces of a rear segment of the body portion 610. A circular shape first slot 614 is recessed upwardly from a bottom surface of a rear portion of the slider member 61, and a rectangular shape second slot 615 is recessed upwardly from a bottom surface of a front portion of the slider member 61. The first slot 614 is in communication to the second slot 615. Furthermore, the second slot 615 is larger than the first slot 614. A rear segment of the spring member 8 is accommodated in the first slot 614, and a front segment of the spring member 8 projecting into the second slot 615.

The actuator member 62 is configured to doorframe-shaped, including a doorhead or transversal beam 621 and two door jambs or leg portions 622 connected to ends of the doorhead 621. A pair of first positioning holes 6221 are respectively defined in middle sections of the doorjambs 622, and a pair of mounting holes 6222 are respectively defined through the lower ends thereof. A pair of engaging holes 6223 are defined in upper sections of the doorjambs 622, and each engaging hole 6223 has a first part of rectangular L-shape (not numbered) proximate to the doorhead 621 and a second part of circular-shape (not numbered) communicated to and under the first part. The pull member 64 includes two L-shaped arm portions 641 spaced apart one another and an intermediate portion 642 connected to the arm portions 641. Two enlarged head parts 643 are respectively formed at free ends of the two arm portions 641. The head part 643 is larger than first part of the engaging hole 6223, but smaller than the second part of the engaging hole 6223. Furthermore, a pull tape 6230 is tied or attached to the intermediate portion 642.

The metal gasket 5 includes a number of walls 51 interconnected together to form a frame, and a plurality of spring tabs 52 formed on outer sides of the walls 51. Two clasp members 53 are connected to ends of the frame and face to one another, and each clasp member 53 defines a hole 54.

The printed circuit board 3 includes a substrate 30, a plurality of first conductive pads 31 arranged on a front section of the substrate 30 and a plurality of second conductive pads 32 located on rear section thereof. A pair of positioning holes 33 are defined in the substrate 30, proximate a front section thereof.

The cable 4 includes an outer insulative jacket 40, a number of wires 41 enclosed in the jacket 40 and insulated from each other. Each of the wires 41 further has an inner conductor 42 for transmitting signal.

When assembly, the insulative jacket 40 of a front segment of the cable 4 is decorticated and then the wires 41 are exposed outside, and then front section of the inner conductors 42 are made to expose outward, then the inner conductors 42 are soldered to the second conductive pads 32 of the PCB 3. The PCB 3 is put on the pair of supporting posts 2133 of the panel portion 2, with the pair of positioning holes 33 thereof aligning with the pair of second screw holes 2134 of the pair of supporting posts 2133, and then a pair of second screw members 72 are inserted into the pair of positioning holes 33 and the pair of second screw holes 2134 to fix the PCB 3 to the panel portion 2. The panel portion 2 is assembled to the base portion 1, with a pair of lateral flange members 211, 212 thereof inserted into the receiving space 110, the protrusion portion 2132 supported by the beam portion 114 of the base portion 1, Simultaneously, the PCB 3 is received in the receiving space 110, the pair of through holes 2211 of the panel portion 2 aligning with a pair of screw holes 1212 of the base portion 1, then a pair of first screw members 71 are inserted into the through holes 2211 and screw holes 1212 to fasten the panel portion 2 and the base portion 1 together.

The gasket 5 is assembled to an outer surface of the housing, with the walls 51 located in the a pair of first depression portions 1110 of the base portion 1 and the second depression portions 2130 of the panel portion 2, the clasp members 53 located in the pair of L-shaped depression portions 1134, the pair of tiny posts 1136 within the depression portions 1134 inserted into a pair of through holes 54 of the pair of mounting members 54 and then soldered thereto.

The slider member 61 is assembled to the second channel 1221 of the first mounting portion 12, with the pair of thin bar members 1231 of the two guiding members 123 received in the two grooves 613 thereof, the cavity 611 aligning with guiding grooves 1232 of the two guiding members 123, the stop member 1133 accommodated in the second slot 615 to prevent the spring member 8 sliding away the slider member 61, the passage 6120 between the tabs 612 facing to the lock tab 1135 in the first channel 1132.

Then, the pull member 64 is mounted to the actuator member 62, with two L-shaped arm portions 641 sandwiched between and linked with the doorjambs 622, and the head parts 643 disposed outside thereof. The actuator member 62 is assembled to the first mounting portion 12 of the base portion 1, with the pair of pivot members 1211 of the first mounting portion received in the pair of first positioning holes 6221 of the doorjambs 622 of the actuator member 62, the pair of mounting holes 6222 located in the end section of the doorjambs 622 aligning with the cavity 611 and the guiding grooves 1232 of the two guiding members 123, then the fasten member 63 is inserted through the pair of mounting holes 6222, the cavity 611 and the guiding grooves 1232. The L-shaped arm portions 641 are partially accommodated in the mounting slots 2213.

While the electronic module 100 disengages away the complementary connector, just exert a pulling force on the pull tape 6230 to have the arm portions 641 slide along the mounting slots 2213 to promote the actuator member 62 rotating around the pivot members 1211, such that the slider member 61 is pushed moving forwardly along the second channel 1221 and the first channel 1132 to urge latch mechanism of the complementary connector deflecting from the lock tab 35, such that the electronic module 100 is separated from the complementary connector. Then the spring member 8 pushes the slider member 61 moving rearward to return its original position.

It is to be understood, however, that even though numerous characteristics and advantages of the present invention have been set forth in the foregoing description, together with details of the structure and function of the invention, the disclosure is illustrated only, and changes may be made in detail, especially in matters of shape, size, and arrangement of parts within the principles of the invention to the full extent indicated by the broad general meaning of the terms in which the appended claims are expressed.

What is claimed is:

1. An electronic module, comprising:
    a housing having a longitudinal body portion and a mounting portion extending rearward from the body portion, the mounting portion having a channel;
    a slider member accommodated in the channel of mounting portion;
    an actuator member including a transversal beam across the mounting portion and two leg portions connected to opposite ends of the transversal beam and disposed outward of lateral sides of the mounting portion, said leg portions pivotally linked to the mounting portion of the housing and connected to the slider member; and
    a pull member having two arm portions spaced apart from each other and an intermediate portion connected to the arm portions, said two arm portions arranged under the transversal beam and engaged with the leg portions of the actuator member.

2. The electronic module as claimed in claim 1, wherein two mounting slots are recessed downwardly from lateral sides of the mounting portion of the housing to accommodate the arm portions of the pull member.

3. The electronic module as claimed in claim 2, wherein an engaging hole is defined in the leg portion of the actuator member, and wherein the arm portion is L-shaped and extends into the engaging hole.

4. The electronic module as claimed in claim 3, wherein an enlarged head part is formed at an end of the arm portion of the pull member and disposed outside of the leg portion.

5. The electronic module as claimed in claim 4, wherein each engaging hole includes a first part proximate to the transversal beam and a second part communicated to and under the first part, and wherein the head part is larger than the first part and smaller than the second part.

6. The electronic module as claimed in claim 1, wherein a spring member is arranged between the slider member and the mounting portion and capable of pushing the slider member rearward along the channel.

7. The electronic module as claimed in claim 6, wherein a stop member is located in a front portion of the channel and a slot is defined in a low section of the slider member, and wherein the spring member is confined in the slot by the stop member.

8. The electronic module as claimed in claim 7, wherein the slot includes a first slot and a second slot, and the second slot is larger than the first slot.

9. The electronic module as claimed in claim 8, wherein a rear portion of the spring member is located in the first slot and a front portion of the spring member extends into the second slot.

10. The electronic module as claimed in claim 9, wherein the stop member is movable into the second slot.

11. The electronic module as claimed in claim 6, wherein two guiding members are arranged at lateral sides of the channel, and each guiding member has a guiding groove recessed downwardly from a top surface thereof.

12. The electronic module as claimed in claim 11, wherein a cavity is defined in an upper portion of the slider member and aligns with the guiding groove of each guiding member.

13. The electronic module as claimed in claim 12, wherein a fasten member links free ends of the two leg portions of the actuator member and passes through the guiding grooves of the guiding members and the cavity of the slider member.

14. The electronic module as claimed in claim 12, wherein two pivot members are formed on lateral sides of the mounting portion and inserted into positioning holes defined in the two leg portions of the actuator member.

15. The electronic module as claimed in claim 11, wherein two bar members are formed on inner sides of the pair of guiding members and extend into two grooves defined in lateral sides of the slider member, respectively.

16. The electronic module as claimed in claim 1, wherein a pull tape is attached to the intermediate portion of the pull member.

17. An electronic module comprising:

a housing having a longitudinal base portion;

a slider member linearly moveable on an underside of the body portion;

an actuator member pivotally mounted to the base portion and including a pair of legs each having upper and lower ends, a transversal beam linked at the upper ends, and the lower ends urging the slider member to move via a fasten member; and a crank like pull member having two arm portions spaced apart from each other and an intermediate portion, where a pulling force is place, connected to the arm portions, wherein an engaging hole is formed in each of the legs to receive a free end of the corresponding arm portions, and said engaging hole looks like a key hole.

18. The electronic module as claimed in claim 17, wherein a pull tape is connected to the intermediate portion to apply said pulling force.

* * * * *